United States Patent [19]

Marsilio

[11] Patent Number: 5,636,737
[45] Date of Patent: Jun. 10, 1997

[54] VIDEO CASSETTE SHIPPING CONTAINER

[75] Inventor: Ronald M. Marsilio, Mogadore, Ohio

[73] Assignee: Alpha Enterprises, Inc., North Canton, Ohio

[21] Appl. No.: 686,560

[22] Filed: Jul. 26, 1996

[51] Int. Cl.⁶ .................................................. B65D 85/67
[52] U.S. Cl. ............................ 206/387.13; 206/1.5
[58] Field of Search ....................... 206/387.1, 387.11, 206/387.13, 1.5, 472, 474, 807, 815

[56] References Cited

U.S. PATENT DOCUMENTS

| | | | |
|---|---|---|---|
| 3,494,458 | 2/1970 | Meierhoefer | 206/63.2 |
| 3,635,331 | 1/1972 | Zucker | 206/45.34 |
| 4,291,801 | 9/1981 | Basilie et al. | 206/387 |
| 4,365,711 | 12/1982 | Long et al. | 206/387 |
| 4,381,836 | 5/1983 | Rivkin et al. | 206/387 |
| 4,489,832 | 12/1984 | Helms | 206/387 |
| 4,634,004 | 1/1987 | Mortensen | 206/387 |
| 4,805,769 | 2/1989 | Soltis et al. | 206/309 |
| 4,838,420 | 6/1989 | Collett et al. | 206/387 |
| 5,285,918 | 2/1994 | Weisburn et al. | 220/265 |
| 5,443,159 | 8/1995 | Cheng | 206/387.13 X |
| 5,499,714 | 3/1996 | Konno | 206/387.13 |
| 5,566,828 | 10/1996 | Claes et al. | 206/1.5 X |

*Primary Examiner*—Jacob K. Ackun
*Attorney, Agent, or Firm*—Sand & Sebolt

[57] ABSTRACT

A video cassette shipping container having a base and a lid hingedly connected by a hinge assembly and movable between open and closed positions. A locking mechanism is mounted on the container and includes a pair of flexible flaps which are hingedly connected to the base and lid by reduced thickness living hinges. One flap includes a pair of locking tabs with barbed ends and the other flap includes a pair of slotted housings which are aligned with and received the tabs therein to secure the container in a locked position. The container is opened by pressing inwardly on a thumb pad located adjacent the ends of the flexible flaps. The flaps flex inwardly and the ends thereof deflect outwardly. The flaps are grasped and pulled outwardly and along the front of the container by a user. The reduced thickness living hinges are torn from the container leaving a usual VHS video cassette storage container with latching tabs to frictionally secure the container in the closed position and protect the VHS tape from dirt, debris and damage during everyday use. A concave recess is formed in the front wall of the container to receive the tear-away flaps therein to provide a flat smooth end wall during shipment and to provide an area to facilitate opening of the container after removal of the flaps.

15 Claims, 4 Drawing Sheets

VIDEO CASSETTE SHIPPING CONTAINER

BACKGROUND OF THE INVENTION

1. Technical Field

The invention relates to shipping containers. More particularly, the invention relates to a shipping container for shipping and storing video cassette tapes. Even more particularly, the invention relates to a shipping container having a disposable locking mechanism which secures the video cassette tape within the container for shipment and which is unlocked by tearing the locking mechanism from the container leaving a video storage container which then can be used by the recipient to store the video cassette tape.

2. Background Information

Home shopping and mail order purchasing has become an increasing popular method in the retail industry to both market and sell video cassette tapes and particularly the VHS style tapes. Home shopping channels market and sell various movies and instructional tapes recorded on these VHS tapes which consumers purchase using their telephone and a credit card. The VHS tapes are mailed to the consumer and the consumer's credit card is charged accordingly. Various video clubs market different movie titles to their club members at a price which is lower than most retail stores. The members choose movies they wish to purchase from a catalog listing and the movie clubs mail the selected movies to the club members.

Currently, these VHS video tapes are packaged in a usual video cassette storage container having a latch to frictionally retain the container in a closed position. The storage container and enclosed VHS tape are then packaged in an outer shipping container and mailed to the consumer. The consumer must open the shipping container to determine if the contents of the package is the same as what he or she ordered. Once the shipping container is opened the consumer has access to the video cassette for viewing or copying.

Most mail order retailers offer a 30-day money back guarantee on their videos. One problem retailers have with this method of selling videos is that once the consumer opens the package and views the video, the purchaser has gained the benefit of enjoying the movie and can return the tape for a refund. Further, the VHS tapes may be copied to blank VHS tapes allowing the purchaser to retain a copy of the video returning the original for a refund. Also, this method of shipping VHS tapes is not economical for the retailer in that the extra material required for the second or outer shipping container and the extra weight that the shipping container adds to the package raises the material costs and the shipping expenses, to mail the VHS tape to the consumer. It is desirable to mail order retailers to ship VHS tapes in a single lightweight shipping container with a locking mechanism which prevents tampering of the tape during shipment and allows the consumer to read the title of the enclosed VHS tape and return the unopened shipping container and enclosed tape for a full refund. The shipping container must also provide a usable VHS storage container in which the consumer can store the tape during everyday use.

One such container is shown in U.S. Pat. No. 5,285,918. This prior art container has a pair of locking tangs formed integrally with the lid and having barbed ends which extend into aligned openings formed in base. The tangs are torn from the container and discarded when the container is opened by a user, providing a frictionally latching container in which the video cassette is stored during everyday use.

Although this prior art shipping container is adequate for the purpose for which it was intended, the lid of the prior art container includes a downwardly extending U-shaped wall which overlaps the walls of the base forming an outwardly extending edge or lip which could get caught on other packages during shipment possibly breaking or damaging the container and its contents. Likewise, the locking mechanism extends outwardly from the front wall of the base and also could get caught and possibly torn or ripped from the container during shipping thereof. Once the locking tangs are removed from the container, the container can easily pop open if bumped or dropped during shipment. Also, after removal of the locking tangs by the purchaser, two holes remain in the container through which dust can enter the container interior.

Therefore, the need exists for an improved video cassette shipping container which can be molded as a one-piece member of a high impact lightweight polypropylene, which has a removable and disposable locking mechanism which secures the enclosed objects and is easily removed by tearing a pair of reduced thickness living hinges, which leaves a VHS storage container which can be used to store a VHS tape during everyday use by a consumer, and which has a cavity formed in an outer surface of a front wall which receives the locking mechanism and allows the locking mechanism to sit flush with the front wall of the container preventing the locking mechanism from being caught and damaged on other objects during shipping of the container and providing a sleek attractive design. There is no such video cassette shipping container of which we are aware which accomplishes these results.

SUMMARY OF THE INVENTION

Objectives of the invention include providing a video cassette shipping container which is molded as a compact one-piece member of a high impact lightweight polypropylene and which protects the enclosed video cassette from damage and theft during shipment from a mail order retailer to a consumer.

Another objective is to provide such a container which has a locking mechanism formed by a pair of tear-away flaps which lock the container in a closed position and which are mounted on the container by a pair of reduced thickness living hinges which allow the locking mechanism flaps to be torn or ripped from the shipping container allowing access to the contents enclosed therein.

A further objective is to provide such a container which provides a VHS storage container which frictionally latches in a closed stored position to protect the enclosed VHS tape from dirt, debris and damage after the locking mechanism flaps have been removed from the container by the purchaser.

Still another objective is to provide such a container which has rounded corners to reduce chipping or breakage during shipment from the retailer to the consumer.

Another objective is to provide such a container which includes a shipping label which is adhered to an outside surface of the container; which includes areas for the recipient's address, the sender's address and postage; and which is easily removed by the recipient upon receipt of the container.

A still further objective is to provide such a container which has a cavity formed in a front outer wall thereof which receives the locking mechanism allowing the locking mechanism to sit flush with the front wall of the container and provide a sleek attractive appearance to the container.

These objectives and advantages are obtained by the improved video cassette container of the present invention, the general nature of which may be stated as including a first compartment which includes a pair of spaced sidewalls and an end wall; a second compartment which includes a pair of spaced sidewalls and an end wall; first hinge means extending between the first and second compartments for moving said container between open and closed positions; locking means formed on the container for locking said container in the closed position, said locking means including a pair of removable disposable flaps each of which extends along a respective end wall exterior of said compartments, said locking means further including at least one locking projection extending from one of said flaps and at least one locking housing formed on the other of said flaps, said locking projection engages said locking housing to secure the container in the locked position; and second hinge means extending between said flaps and said end walls for moving said flaps from an unlocked position to a locked position.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
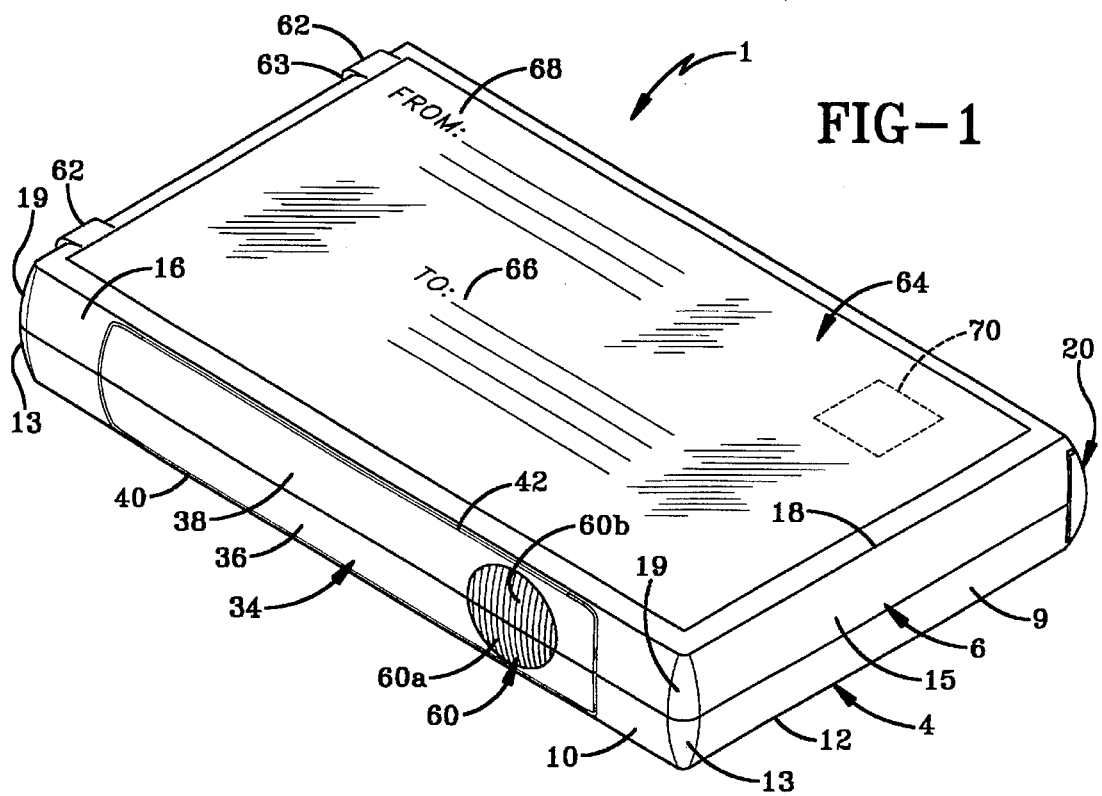
FIG. 1 is a perspective view of the video cassette shipping container of the present invention shown in a closed locked shipping position.
Figure 2:
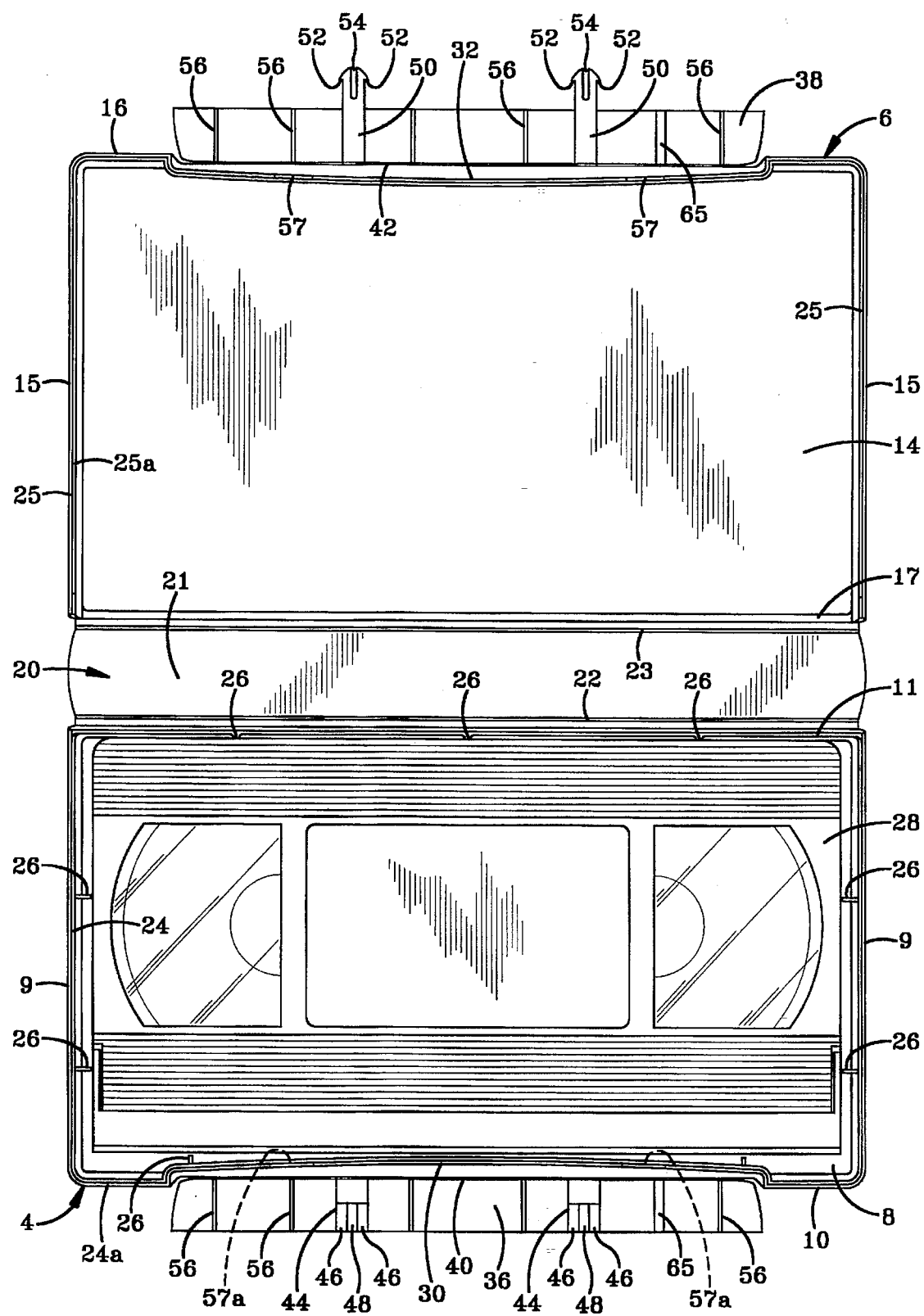
FIG. 2 is a plan view of the shipping container of FIG. I shown in a full open position holding a VHS tape.

The video cassette shipping container of the present invention is shown in FIG. 1 in a closed locked shipping position, and is indicated generally at 1. Container 1 has a rectangular box-shaped configuration and preferably is molded as a one-piece member of a plastic material, such as a high impact polypropylene. Container 1 includes a first compartment or base indicated generally at 4 hingedly connected to a second compartment or lid indicated generally at 6 (FIG. 2). Base 4 has a bottom wall 8 with upstanding parallel side walls 9 and front and rear end wails 10 and 11, respectively. Walls 9–11 are formed integrally with bottom wall 8 forming an outer rounded edge 12 (FIG. 1) therebetween. Side walls 9 are formed integrally with front and rear end walls 10 and 11, respectively, forming outer rounded corners 13 therebetween. Sidewalls 9 and front end wall 10 are equal in height with rear end wall 11 being approximately ¾ of the height thereof.

Lid 6 includes a flat rectangular-shaped top closure wall 14, similar in size and configuration to bottom wall 8, along with upstanding parallel side walls 15 and front and rear end walls 16 and 17, respectively. Walls 15–17 are formed integrally with closure wall 14 forming an outer rounded edge 18 therebetween, and side walls 15 are formed integrally with front and rear end walls 16 and 17, respectively, forming outer rounded corners 19 therebetween. Sidewalls 15 and front end wall 16 are equal in height with rear end wall 17 being approximately ⅓ the height thereof. Walls 9 and 10 of base 4 are stepped to form an inwardly offset shelf 24 and an upwardly extending top edge 24a. Walls 15 and 16 of lid 6 are complementarily stepped and form an outwardly offset shelf 25 and an upwardly extending top edge 25a. Top edges 24a and 25a rest on shelves 25 and 24, respectively, forming a relatively dust-free seal therebetween when container 1 is in the closed position.

A hinge assembly indicated generally at 20 extends between base 4 and lid 6 and includes a rectangular-shaped hinge panel 21 connected between base 4 and lid 6 by living hinges 22 and 23, respectively. Living hinge 22 is formed integrally with rear wall 11 of base 4 and extends outwardly from an outer surface thereof and living hinge 23 is formed integrally with the top edge of rear wall 17 of lid 6. A plurality of ribs 26 extend inwardly from the inner surface of walls 9–11 of base 4 for centrally positioning a usual VHS tape 28 within base 4 as shown in FIG. 2.

Figure 7:
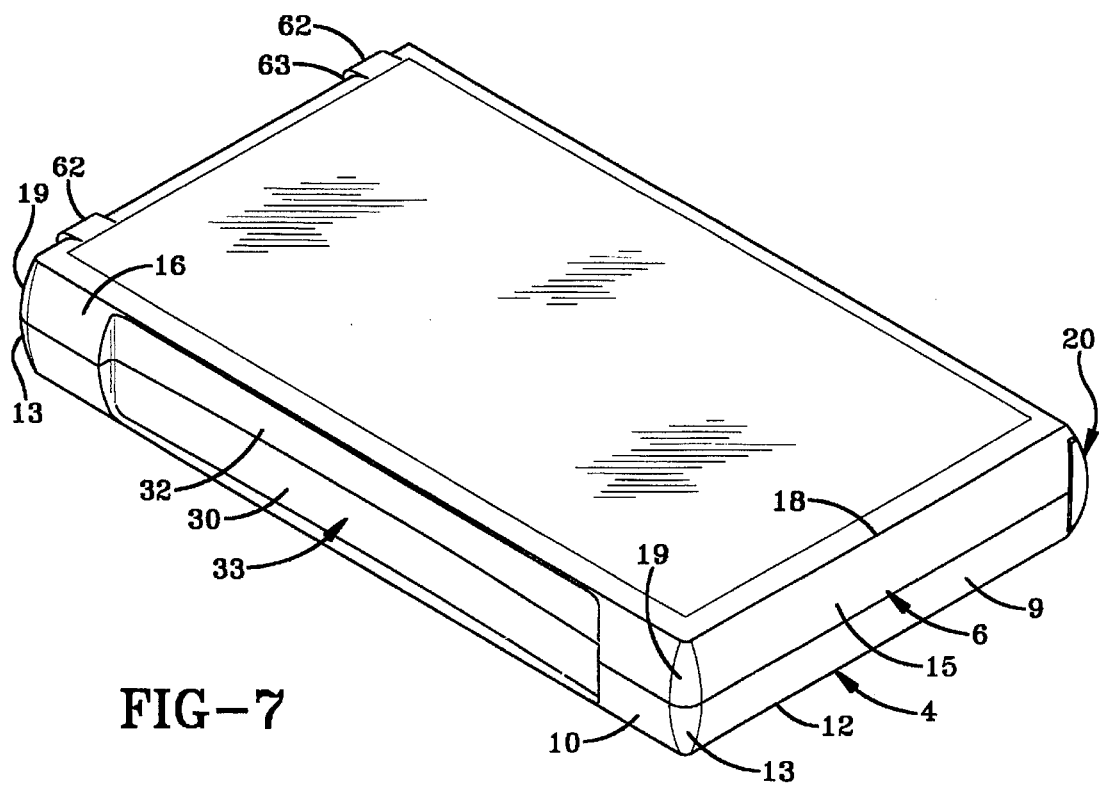
FIG. 7 is a perspective view of the shipping container showing the container for use as a usual storage container after removal of the locking mechanism and shipping label.

In accordance with one of the features of the invention, front end walls 10 and 16 of base 4 and lid 6, respectively, each have an inwardly extending curved arcuate-shaped recess 30 and 32, respectively, which extends partially to their respective end walls, and which together form a central cavity 33 (FIG. 7). Cavity 33 allows a user to easily open container 1 when container 1 is in the closed latched position, as described below in further detail.

In accordance with another of the features of the invention, container 1 includes a locking mechanism, indicated generally at 34 (FIG. 1). Mechanism 34 includes a pair of thin flexible flaps 36 and 38 hingedly mounted to base 4 and lid 6, respectively, by reduced thickness living hinges 40 and 42, respectively (FIG. 2). Flaps 36 and 38 are formed of the same plastic material as base 4, lid 6 and hinge assembly 20, and the thin construction thereof allows the flaps to bend and flex when locking mechanism 34 is removed from container 1, as described further below. Living hinges 40 and 42 mount flaps 36 and 38, respectively, to outer edges of arcuate-shaped recesses 30 and 32, respectively, and extend partially thereacross within recesses 30 and 32 to form a continuous smooth, substantially flat end wall to the container when in the locked shipping position as shown in FIG. 1.

Figure 4:
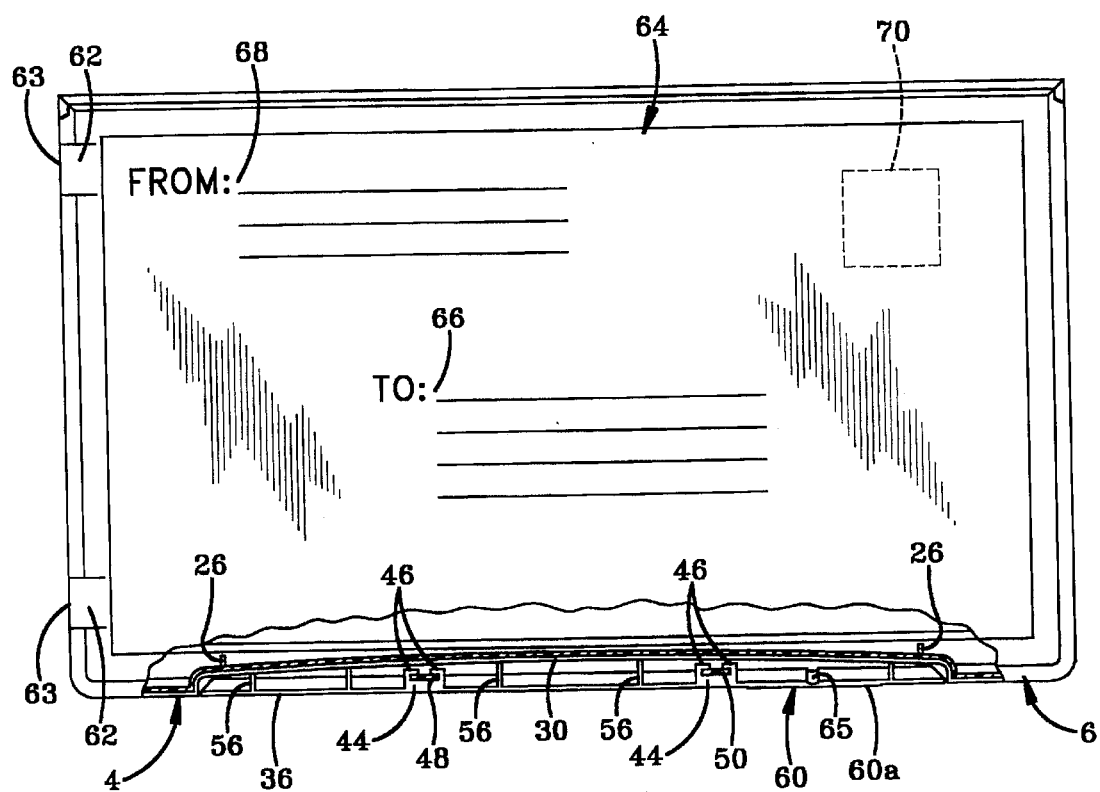
FIG. 4 is a top plan view of the container of FIG. 3 with a portion of the locking mechanism broken away and shown in section.

Flap 36 includes a pair of housings 44 (FIG. 2) each of which is formed on an inner surface of the flap, and which includes a pair of inwardly extending L-shaped flanges 46 (FIG. 4) which form a generally T-shaped slot 48 therebetween. Flap 38 includes a pair of locking tabs 50, each having a pair of spaced barbed ends 52 separated by a U-shaped slotted opening 54 formed centrally therein. Locking tabs 50 extend from an inner surface of flap 38 and align with housings 44 and extend therein to secure locking mechanism 34 in the locked shipping position. Flaps 36 and 38 each include a plurality of spaced parallel ribs 56 formed on the inner surface thereof, which extend into cavity 33 of container 1 and allow locking mechansim 34 to sit flush with the outer surface of front walls 10 and 16 when container 1 is in the locked position providing a sleek attractive design to the outer surface of the container.

A circular thumb pad 60 is formed at one end 61 of locking mechanism 34 (FIG. 1), spaced inwardly from living hinges 40 and 42, with flaps 36 and 38 having semi-circular portions 60a and 60b, respectively, of thumb pad 60 formed thereon. The inner surfaces of flaps 36 and 38 located opposite thumb pad portions 60a and 60b are free of ribs 56 and are formed with a groove 65 which allows thumb pad 60 to be pressed inwardly and which facilitates an outward bending of end 61, as described below. Base 4 and lid 6 each include a pair of aligned supports 62 (FIGS. 1 and 4) which are formed integrally with end walls 9 and 15, respectively. Supports 62 have a flat outer surface 63 which allows container 1 to stand upright on a flat surface. A shipping label 64 is adhered to the outer surface of closure wall 14 of lid 6 and includes areas 66 and 68 for addressing label 64 with the recipient's and the sender's addresses, respectively, and an area 70 for postage. A pair of usual latching tabs 57 are formed on an inner edge of front end wall 16 of lid 6 which engage a pair of aligned notches 57a formed in front end wall 10 of base 4 to frictionally latch container 1 in the closed position subsequent to removing locking mechanism 34.

Figure 3:
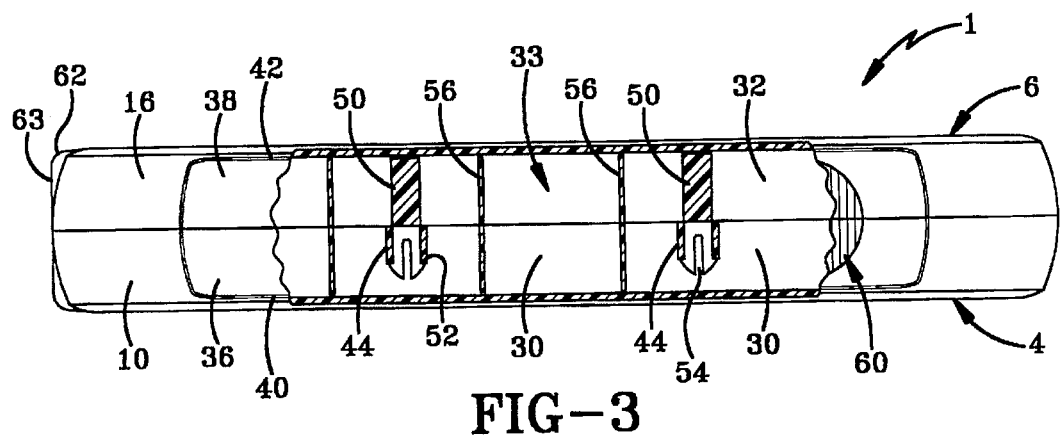
FIG. 3 is a side elevational view with a portion of the locking mechanism broken away and shown in section.

In operation, VHS tape 28 is placed within base 4 and is centered therein by ribs 26 as shown in FIG. 2. Flaps 36 and 38 of base 4 and lid 6, respectively, are pivoted to an upright position and as lid 6 is pivoted to the closed position, locking tabs 50 extend within slots 48 of housings 44, and U-shaped openings 54 of locking tabs 50 allow barbed ends 52 to flex inwardly as tabs 50 extend within slots 48. Lid 6 is closed to the position shown in FIGS. 1, 3 and 4 and barbed ends 52 of tabs 50 snap outwardly and engage the bottom ends of housings 44 (FIG. 3), securing locking mechanism 34 within cavity 30. Flaps 36 and 38 lie in concave recess 30 and 32 when in the locked position providing a smooth outer surface to the front wall of the container and providing a sleek attractive design to container 1 when container 1 is in the locked shipping position.

Figure 5:
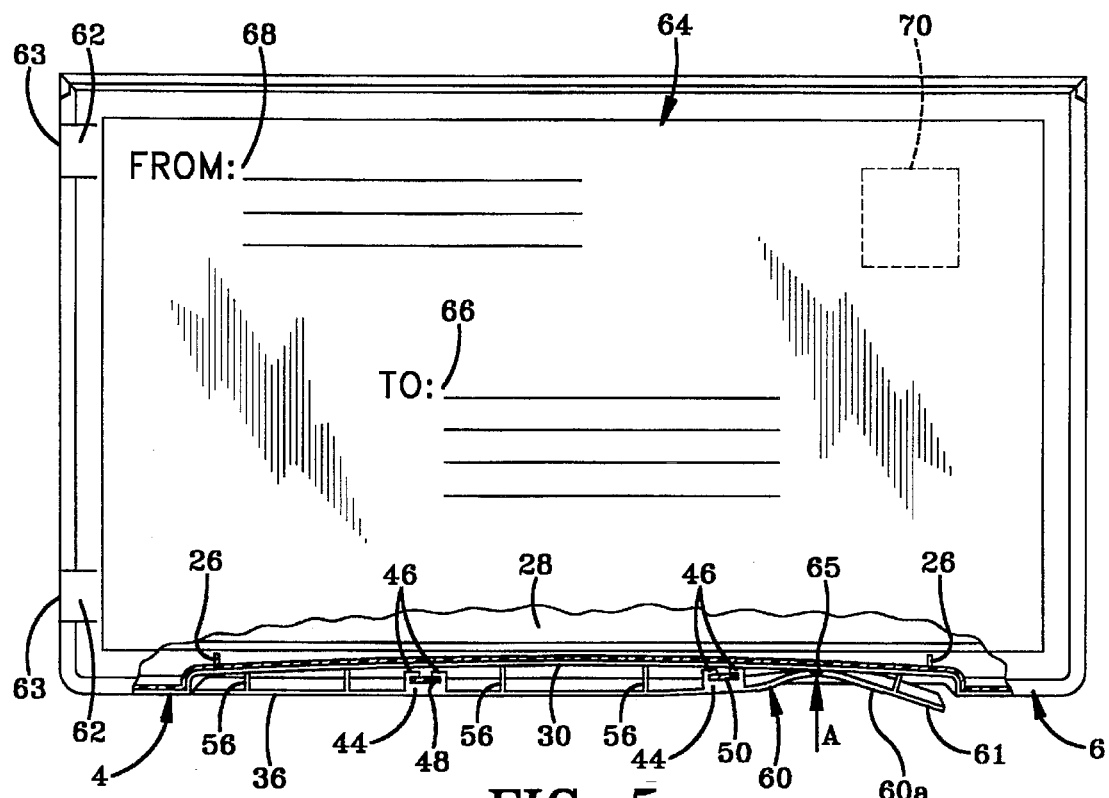
FIG. 5 is a view similar to FIG. 4 showing a first unlocking step.
Figure 6:
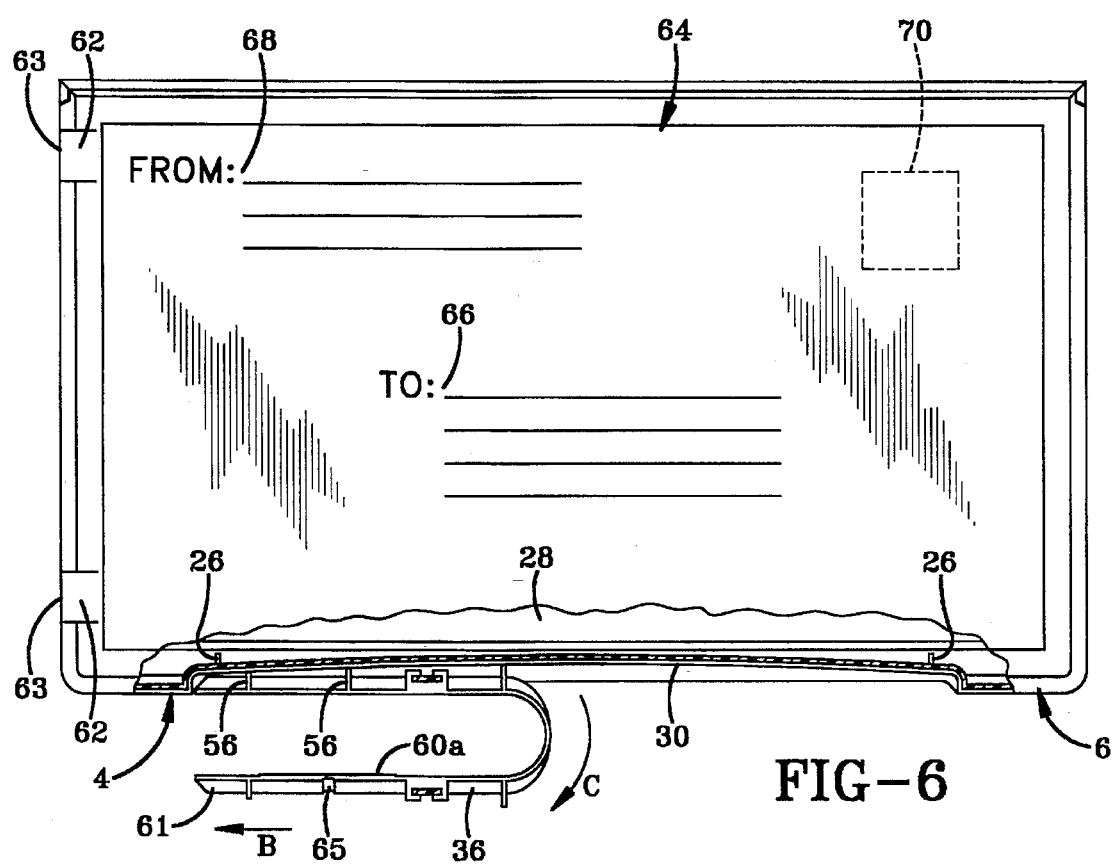
FIG. 6 is a view similar to FIG. 5 showing a second unlocking step.

Container 1 is shipped to the address listed in area 66 of shipping label 64, and upon receipt of container 1, the recipient or user opens container 1 by pressing thumb pad 60 in the direction of arrow A (FIG. 5). End 61 of locking mechanism 34 which is adjacent thumb pad 60 and which is free of living hinges 40 and 42, is deflected outwardly as pressure is applied to thumb pad 60 allowing the user to grasp end 61 and pull the interconnected flexible flaps 36 and 38 in the direction of arrow B (FIG. 6). Reduced thickness living hinges 40 and 42 are torn or ripped from their integral connection with base 4 and lid 6, respectively, as the flaps flex in the direction of arrow C (FIG. 6). The user pulls locking mechanisms 34 until flaps 36 and 38 have been completely torn from container 1 (FIG. 7) and discarded. The user's thumbs or fingers are inserted within arcuate-shaped sections 30 and 32 of base 4 and lid 6, and lid 6 is pried away from base 4 easily disengaging the latching mechanism, opening container 1 and exposing enclosed VHS tape 28 for removal and viewing thereof. Shipping label 64 can be removed from container 1 by the purchaser and the container forms a usual VHS storage container which protects VHS tape 28 from dust, debris and damage during everyday use by the user. It is understood that disposable locking mechanism 34 could be replaced by a key operated locking mechanism allowing container 1 to be opened with the use of a key and to be placed back in the locked shipping position for reuse as a shipping container if desired without effecting the concept of the present invention.

In summary, container 1 is molded in as a one-piece member of a lightweight inexpensive plastic material. Living hinges 22 and 23 allow base 4 and lid 6, respectively, to pivot toward one another when container 1 is placed in the closed position, and living hinges 40 and 42 allow flaps 36 and 38, respectively, to pivot 90° when container 1 is placed in the locked position. Tabs 50 cooperate with housings 44 to secure one-time locking mechanism 34 in the locked shipping position.

Locking mechanism 34 is torn from container 1 for the user to gain access to VHS tape 28. The absence of ribs 56 on the inner surface of locking mechanism 34 opposite thumb pad 60 in combination with grooves 63, allow flaps 36 and 38 of locking mechanism 34 to flex inwardly deflecting end 61 thereof outwardly for subsequent grasping and pulling by the user. The reduced thickness of living hinges 40 and 42 allow flaps 36 and 38 of locking mechanism 34 to be easily torn from container 1 providing a usual VHS video cassette storage container. The rounded edges and corners of base 4 and lid 6 reduce chipping and cracking during shipment and use which often occur with square cornered containers. Cavity 33 allows locking mechanism 34 to sit flush with the outside surface of the front walls when in the locked shipping position, and provides an area for the user to insert his or her thumbs and easily open the container after the locking mechanism has been removed therefrom. Furthermore, after removal of flaps 36 and 38, no holes are left in the container through which dust can enter as in prior shipping/storage containers.

Container 1 could be used to ship other items such as audio cassettes, compact discs, video games or other articles without effecting the concept of the invention by molding container 1 to correspond to the respective size of the item to be shipped and subsequently stored therein.

Accordingly, the improved video cassette shipping container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved video cassette shipping container is constructed and used, the characteristics of the construction, and the advantageous, new and useful results obtained; the new and useful structures, devices, elements, arrangements, parts and combinations, are set forth in the appended claims.

I claim:

1. A container for shipping and storing objects, said container including:

a first compartment which includes a pair of spaced sidewalls and an end wall;

a second compartment which includes a pair of spaced sidewalls and an end wall;

first hinge means extending between the first and second compartments for moving said container between open and closed positions;

locking means formed on the container for locking said container in the closed position, said locking means including a pair of removable disposable flaps each of which extends along a respective end wall exterior of said compartments, said locking means further including at least one locking projection extending from one of said flaps and at least one locking housing formed on the other of said flaps, said locking projection engages said locking housing to secure the container in the locked position; and second hinge means extending between said flaps and said end walls for moving said flaps from an unlocked position to a locked position.

2. The container defined in claim 1 in which the second hinge means includes a pair of reduced thickness living hinges.

3. The container defined in claim 1 in which each flap is formed of a thin flexible plastic.

4. The container defined in claim 3 in which the one flap includes a pair of the locking projections, and in which the other flap includes a pair of said locking housings aligned with said locking projections.

5. The container defined in claim 4 in which each locking projection includes a flexible tab having a barbed end; in which each locking housing includes a slotted opening adapted to receive said flexible tab; and in which the barbed end of said tab engages an end of said locking housing to secure the flaps in the locked position.

6. The container defined in claim 5 in which each of the tabs includes a pair of spaced barbed ends separated by a slotted opening formed centrally therein; and in which the locking housings include a pair of inwardly extending L-shaped flanges.

7. The container defined in claim 1 in which a concave recess is formed in each end wall of the first and second compartments; in which said recesses form a cavity in the container when the container is in the closed position; and in which said cavity receives the locking means flaps therein, whereby said flaps are substantially flush with the end walls of the first and second compartments when the container is in the locked position.

8. The container defined in claim 7 in which a plurality of ribs are formed on an inner surface of the locking means flaps, said ribs abut an outer surface of the cavity when the flaps are in the locked position.

9. The container defined in claim 7 in which a thumb pad is formed on the locking means flaps adjacent one end thereof; and in which said flaps are free of said ribs opposite of said thumb pad.

10. The container defined in claim 9 in which a groove is formed on the inner surface of the locking means flaps generally opposite of the thumb pad to provide flexibility to said flaps.

11. The container defined in claim 1 in which the first and second compartments, the first and second hinge means and the locking means are formed of a one piece member of plastic material.

12. The container defined in claim 1 further including latching means formed on the container for releasably retaining said container in a latched position subsequent to unlocking the container.

13. The container defined in claim 1 in which an edge of one of the first and second storage compartments overlaps an adjacent edge of the other of the first and second storage compartment when the container is in the closed position.

14. The container defined in claim 1 in which the first hinge means includes a substantially flat rectangular-shaped panel and a pair of living hinges which extend between said panel and the first and second compartments.

15. The container defined in claim 1 in which one of said compartments include a plurality of ribs for centering an object within said one storage compartment.

* * * * *